United States Patent
Derr et al.

(10) Patent No.: US 9,534,488 B2
(45) Date of Patent: Jan. 3, 2017

(54) ELECTROMAGNETIC RANGING SOURCE SUITABLE FOR USE IN A DRILL STRING

(71) Applicant: Halliburton Energy Services, Inc., Houston, TX (US)

(72) Inventors: Doug Derr, Houston, TX (US); Andrew J. Cuthbert, Spring, TX (US); Joe E. Hess, Richmond, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/891,558

(22) PCT Filed: Jul. 18, 2014

(86) PCT No.: PCT/US2014/047263
§ 371 (c)(1),
(2) Date: Dec. 9, 2015

(87) PCT Pub. No.: WO2016/010562
PCT Pub. Date: Jan. 21, 2016

(65) Prior Publication Data
US 2016/0177705 A1     Jun. 23, 2016

(51) Int. Cl.
*E21B 47/022*     (2012.01)
*E21B 47/01*     (2012.01)
(Continued)

(52) U.S. Cl.
CPC ........... *E21B 47/02216* (2013.01); *E21B 7/04* (2013.01); *E21B 47/01* (2013.01); *E21B 47/022* (2013.01);
(Continued)

(58) Field of Classification Search
CPC ...... E21B 33/12; E21B 33/127; E21B 33/122; E21B 34/08; E21B 34/06; E21B 34/102; E21B 34/10; H01Q 7/08; H01Q 7/00
See application file for complete search history.

(56) References Cited

U.S. PATENT DOCUMENTS

| | | | |
|---|---|---|---|
| 3,967,201 A * | 6/1976 | Rorden | E21B 47/122 340/850 |
| 4,458,767 A | 7/1984 | Hoehn, Jr. | |

(Continued)

FOREIGN PATENT DOCUMENTS

| | | |
|---|---|---|
| WO | WO-2008/008346 | 1/2008 |
| WO | WO-2014/044628 | 3/2014 |

(Continued)

OTHER PUBLICATIONS

"PCT Application as Filed", Appl No. PCT/US2014/055158, "Rare Earth Alloys as Borehole Markers," filed Sep. 11, 2014, 25 pgs.
(Continued)

*Primary Examiner* — Yong-Suk (Philip) Ro
(74) *Attorney, Agent, or Firm* — Iselin Law PLLC; Alan Bryson

(57) ABSTRACT

An electromagnetic ranging source includes: a tubular body having a circumference; a ferromagnetic core conforming to the tubular body and extending at least halfway around the circumference to define a gap with circumferentially-spaced poles; one or more current-carrying windings around the core to induce a magnetic field between the poles; and a downhole power source that drives the one or more current-carrying windings. A related method includes: equipping a first drill string with such an electromagnetic ranging source; extending a first borehole with the first drill string; assembling a second drill string with sensors; and drilling a second borehole while using said sensors to guide the second drill string relative to the first borehole.

16 Claims, 1 Drawing Sheet

(51) Int. Cl.
*G01V 3/18* (2006.01)
*G01V 3/28* (2006.01)
*E21B 7/04* (2006.01)
*E21B 47/024* (2006.01)
*G01V 3/08* (2006.01)

(52) U.S. Cl.
CPC ............... *E21B 47/024* (2013.01); *G01V 3/08* (2013.01); *G01V 3/18* (2013.01); *G01V 3/28* (2013.01)

(56) References Cited

U.S. PATENT DOCUMENTS

| | | | |
|---|---|---|---|
| 4,700,142 | A | 10/1987 | Kuckes |
| 4,791,373 | A | 12/1988 | Kuckes |
| 5,064,006 | A | 11/1991 | Waters et al. |
| 6,230,799 | B1 | 5/2001 | Slaughter et al. |
| 6,249,259 | B1 * | 6/2001 | Goodman ................. H01Q 7/08 340/854.6 |
| 6,814,163 | B2 * | 11/2004 | Kuckes ............. E21B 47/02224 175/45 |
| 7,568,532 | B2 * | 8/2009 | Kuckes ................. E21B 47/024 166/255.2 |
| 8,573,297 | B2 | 11/2013 | Tomberlin et al. |
| 2003/0151408 | A1 | 8/2003 | Kruspe et al. |
| 2004/0144570 | A1 | 7/2004 | Spring |

FOREIGN PATENT DOCUMENTS

| | | |
|---|---|---|
| WO | 2016/010562 | 1/2016 |
| WO | 2016/039755 | 3/2016 |

OTHER PUBLICATIONS

"Search Report and Written Opinion", dated Apr. 17, 2015, Appl No. PCT/US2014/047263, "Electromagnetic Ranging Source Suitable for Use in a Drill String," filed Jul. 18, 2014, 13 pgs.

"PCT International Search Report and Written Opinion", dated Sep. 11, 2014, Appl No. PCT/US2014/055158, "Rare Earth Alloys as Borehole Markers," filed Sep. 11, 2014, 12 pgs.

Hess, Joe E., et al., "PCT Application as Filed", Appl No. PCT/US2014/038430, "Methods and Systems for Identifying and Plugging Subterranean Conduits", filed May 16, 2014, 19 pgs.

IPRP, dated Oct. 19, 2015, Appl No. PCT/US2014/047263, "Electromagnetic Ranging Source Suitable for Use in a Drill String," filed Jul. 18, 2014, 11 pgs.

PCT International Preliminary Report on Patentability, dated Mar. 7, 2016, Appl No. PCT/US2014/055158, "Rare Earth Alloys as Borehole Markers," Filed Sep. 11, 2014, 16 pgs.

PCT Written Opinion of International Preliminary Examining Authority, dated Nov. 30, 2015, Appl No. PCT/US2014/055158, "Rare Earth Alloys as Borehole Markers," Filed Sep. 11, 2014, 4 pgs.

* cited by examiner

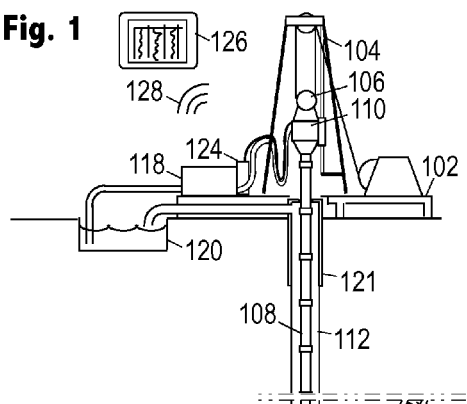
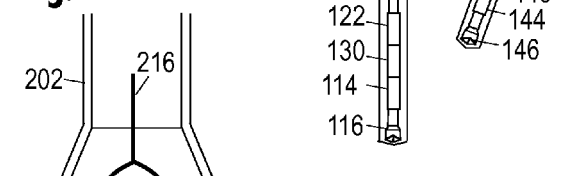
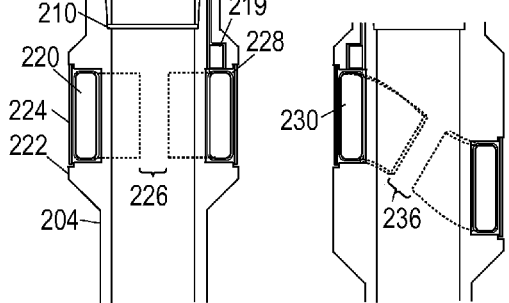
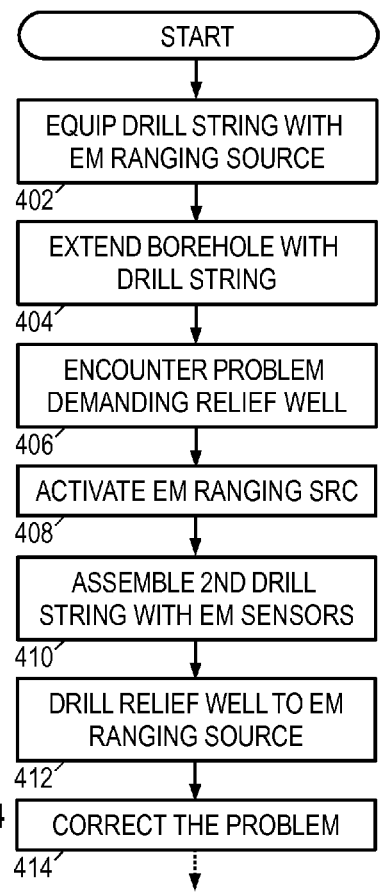
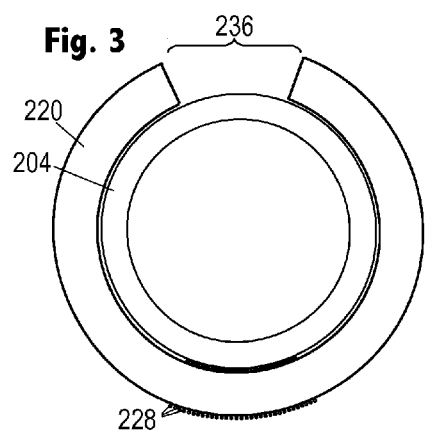

ELECTROMAGNETIC RANGING SOURCE SUITABLE FOR USE IN A DRILL STRING

BACKGROUND

Much effort has been invested in techniques for accurately tracking and drilling boreholes that are to be positioned relative to existing boreholes. Many such techniques rely on the conductivity or ferromagnetism of steel tubing in the reference borehole, yet the range at which such techniques operate has proven to be undesirably limited. In an effort to extend this range, attention has recently turned to the use of one or more beacons in the casing of a reference borehole. See, for example, U.S. Pat. No. 7,568,532 "Electromagnetically determining the relative location of a drill bit using a solenoid source installed on a steel casing" by Kuckes et al, which discloses the use of ranging for drilling parallel wells for steam-assisted gravity drainage (SAGD), yet this solution is unsuitable for one of the more urgent applications of ranging techniques.

Before a borehole can be cased, it must be drilled. It is during the drilling process itself when well control issues, such as pressure kicks or blowouts, are most likely to be encountered. In many cases, such control issues are so severe as to merit the drilling of a relief borehole to intersect the initial borehole in order to inject a dense "kill" fluid that suppresses a further influx of formation fluid. As a general principle, it is desirable to intersect the target borehole as near to the source of the well control issue as possible, yet during the drilling process this source is most likely located in the open portion of the borehole, long before that portion of the hole can be provided with a casing beacon and a power supply line. Often the drill string remains, but as previously noted, techniques relying solely on the ferromagnetic or conductivity properties of the drill string have an undesirably limited range.

BRIEF DESCRIPTION OF THE DRAWINGS

Accordingly, there are disclosed in the drawings and the following description an electromagnetic ranging source suitable for use in a drill string. In the drawings:

FIG. 1 is a schematic view of an illustrative drilling environment with electromagnetic ranging.

FIGS. 2A and 2B are cross-sections of an illustrative electromagnetic ranging source.

FIG. 3 is a transverse cross-section of an illustrative gapped solenoid source.

FIG. 4 is a flowchart of an illustrative drill-string-based electromagnetic ranging method.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

The obstacles outlined above are at least in part addressed by the disclosed electromagnetic ranging techniques employing a drill string source that includes a ferromagnetic core extending at least halfway around the circumference of a tubular body to define a gap with circumferentially-spaced poles, with a current-carrying winding that induces a magnetic field between the poles. Current is supplied to the windings by a downhole power source, which in at least some cases is a fluid flow-powered electrical generator that operates during the occurrence of well control issues to generate an electromagnetic field for guiding the drilling of a relief well. FIG. 1 is a schematic view of an illustrative drilling environment. A drilling platform 102 supports a derrick 104 having a traveling block 106 for raising and lowering a drill string 108. A top drive 110 supports and rotates the drill string 108 as it is lowered into a borehole 112. The rotating drill string 108 and/or a downhole motor assembly 114 rotates a drill bit 116. As the drill bit 116 rotates, it extends the borehole 112 through various subsurface formations. The downhole motor assembly 114 may include a rotary steerable system (RSS) or other steering mechanism that enables the drilling crew to steer the borehole along a desired path. A pump 118 circulates drilling fluid through a feed pipe to the top drive 110, downhole through the interior of drill string 108, through orifices in drill bit 116, back to the surface via the annulus around drill string 108, and into a retention pit 120. The drilling fluid transports cuttings from the borehole into the retention pit 120 and aids in maintaining the borehole integrity.

FIG. 1 further shows a casing string 121 in the upmost stage of the borehole 112. It is typical for boreholes to be drilled and cased in stages, with each successive stage having a borehole and casing of a reduced diameter relative to the previous stages. A number of benefits are achieved by this staged approach, including stabilization of the upper borehole stages against collapse and protecting those formations from being exposed to the fluids flowing in the borehole. With the upper portions of the borehole cased, the drill string 108 can be used to further extend the borehole. While such drilling is performed, a blowout prevention (BOP) system is attached to the casing to contain or at least mitigate pressure kicks and other well control issues.

The drill bit 116 and downhole motor assembly 114 form just one portion of a bottom-hole assembly that includes one or more drill collars (thick-walled steel pipe) to provide weight and rigidity to aid the drilling process. Some of these drill collars include built-in logging instruments to gather measurements of various drilling parameters such as position, orientation, weight-on-bit, borehole diameter, etc. The tool orientation may be specified in terms of a tool face angle (rotational orientation or azimuth), an inclination angle (the slope), and compass direction, each of which can be derived from measurements by magnetometers, inclinometers, and/or accelerometers, though other sensor types such as gyroscopes may alternatively be used. In one specific embodiment, the tool includes a 3-axis fluxgate magnetometer and a 3-axis accelerometer. As is known in the art, the combination of those two sensor systems enables the measurement of the tool face angle, inclination angle, and compass direction. Such orientation measurements can be combined with gyroscopic or inertial measurements to accurately track tool position.

Orientation measurements, drilling parameters, and the measurements of any logging instruments, are collected by a control sub 122 and typically stored in internal memory for later retrieval when the bottom-hole assembly is pulled back to the surface. The control sub 122 further includes a modem for communicating selected portions of the collected data via a telemetry channel to a surface interface 124 and for receiving commands from the surface interface 124. Various telemetry channels have been employed and may be suitable for use in the disclosed system, including mud pulse telemetry, through-wall acoustic wave telemetry, wired drill pipe, and electromagnetic telemetry.

A processing unit, shown in FIG. 1 in the form of a tablet computer 126, communicates with surface interface 124 via a wired or wireless network communications link 128, and provides a graphical user interface (GUI) or other form of user interface that enables a user to review received telemetry data and to provide commands to control the various portions of the system including the processing unit 126, the interface 124, and the tools in the bottom-hole assembly. The processing unit can take alternative forms, including a desktop computer, a laptop computer, an embedded processor, a cloud computer, a central processing center accessible via the internet, and any combination of the foregoing.

The bottom-hole assembly of drill string 108 further includes an electromagnetic ranging source 130 which can be activated to generate a static magnetic field or low-frequency electromagnetic field around the bottom-hole assembly. The source 130 may be activated manually by the transmission of a command from the surface interface 124 to the control sub 122, the control sub 122 then responsively enabling a downhole power source for the electromagnetic ranging source. Any suitable downhole power source may be employed, including batteries, fuel cells, and electrical generators. The source 130 may be alternatively be activated automatically by the control sub 122 upon detection of circumstances indicative of a well control issue, e.g., a pressure kick or excessive flow rate. As yet another alternative, the source 130 may operate whenever fluid is circulating through the drill string.

Upon occurrence of a well control issue, drilling is halted. The source 130 generates a magnetic or electromagnetic field that serves as a guidance beacon. Modulation of the field, e.g., by pulsing the field, alternating the field at low frequency (e.g., below 10 Hz), or rotating the field orientation, is believed to increase the detectability of the field at long distances.

A second drill string having a magnetic field sensing tool 140, a control sub 142, a directional drilling system 144, and a bit 146, is assembled and used to drill a second borehole from a second drilling platform similar to the one described previously. The magnetic field sensing tool 140 employs multi-axis magnetic field sensors to perform repeated measurements whereby the direction to the source 130, and preferably the distance to the source 130, can be estimated and used to direct the second borehole to intersect (usually at a shallow angle) and establish hydraulic communication with the first borehole. A high-density fluid is then quickly injected into the first borehole to suppress further inflows of formation fluid and to thereby re-establish control of the fluid flows in the first borehole.

The multi-axis magnetic field sensors may take any suitable form, including fluxgate magnetometers and atomic magnetometers, both of which generally exhibit high, directional, sensitivity. Moreover multiple such magnetometers may be combined to form magnetic gradiometers with multi-axis sensitivity.

FIG. 2A is a schematic cross-section of an illustrative electromagnetic ranging source 130. The illustrative source includes a power section 202 and a solenoid section 204 joined by a threaded connection 206. Other forms of connection as well as a unitary construction would also be suitable. The threaded connection 206 has both an outer shoulder 208 and an inner shoulder 210, either of which may be used to provide an electrical coupling 212 between the sections 202, 204. The coupling 212 may be inductive, capacitive, or galvanic, and in any event may be designed to have a relatively small impedance. A wiring chase 214 may be drilled for insulated electrical conductors to connect to the electrical coupling 212 and thereby couple to corresponding conductors in the other section. In some embodiments the tool body serves as part of the circuit, e.g., as a current return, to reduce the number of insulated conductors that are routed through the chase 214.

As part of the drill string 108, both sections 202, 204 have tubular bodies that provide an internal flow path for drilling fluid 216 from the surface to reach the bit 116. Some suitable alternative configurations employ a "reverse circulation" configuration where drilling fluid from the surface reaches the bit via the annulus around the drill string and returns to the surface through the internal passage. Yet other suitable configurations may include multiple internal flow paths to carry flows in both directions.

The power section 202 includes an electrical generator 218 that is powered by the fluid flow along at least one of the internal or annular flow paths. The illustrated electrical generator 218 has a turbine in the internal flow path that is driven by the flow to spin, the spinning causing permanent magnets to move relative to fixed wire coils, thereby generating an alternating current. As the alternation rate is expected to be at an undesirably high frequency, the alternating current is rectified by an electronics module 219 to create a DC current that may be stored (e.g., by a battery or capacitor) and used to power the solenoid. If desired, the solenoid power may be pulsed or converted by the module 219 to a low-frequency alternating current. As the impedance of coupling 212 is expected to be lower at high frequencies, the module 219 may be located in the solenoid section 204.

The solenoid section 204 includes a ferromagnetic core 220 positioned in a recess defined by guard flanges 222 and protected by a cover 224. The core 220 extends at least halfway around the circumference of the tubular body, leaving a gap 226 between the circumferentially-spaced poles. A coil of current-carrying windings 228 encloses the core 220 to induce a magnetic field between the poles. The use of a ferromagnetic core 220 enables the magnetic field across the gap to be made quite intense.

For descriptive purposes, we note that the gap 226 has three dimensions, which we label as "in-line" (parallel to the field between the poles), "radial" (extending outward from the axis of the tubular body), and "transverse" (perpendicular to the other two dimensions).

In FIG. 2A, the gap's transverse dimension is parallel to the axis of the tubular body, but this is only illustrative. FIG. 2B shows an alternative embodiment where the core 230 and the in-line dimension of the gap between the circumferentially-spaced poles are angled with respect to the axis of the tubular body. Upon rotation of the drill string, the different gap orientations will modulate the field pattern in different ways. Additional ferromagnetic cores may be added to the solenoid section with separate windings that can be driven together or in sequence. The gaps of the additional cores may be aligned to enhance the field, or they may be oriented differently (e.g., with orthogonal orientations) to maximize detectability in all directions.

At least in the neighborhood of the gap 226, 236, the tubular body of solenoid section 204 may be formed of a non-magnetic steel or other non-magnetic material to avoid "shorting" the magnetic field across the gap. In at least some cases, the tubular body of section 204 is entirely formed from a non-magnetic material. The gap 236 is shown as an empty air-gap, but in practice the gap may be filled with any relatively non-magnetic material, including a block of ceramic or polymer material.

FIG. 3 shows a cross section of the solenoid section 204's tubular body with the ferromagnetic core 220 conforming to the tubular body and extending at least halfway around the circumference to define the gap 236. As shown in FIG. 2B, the poles that define the gap are circumferentially spaced, i.e., with an in-line dimension that has at least some circumferential component, though as shown by the angled gap in FIG. 2B, the in-line dimension may also have a directional component parallel to the axis of the tool.

The material of the core of the magnet may be "soft" low coercivity materials, such as silicon steel or soft ferrite, to minimize hysteresis. To minimize eddy currents and energy dissipation, the construction of the core may employ stacks of thin sheets (laminations) oriented parallel to the magnetic field, separated by thin insulative coatings to suppress electrical current flow.

The core and the windings may be thermally coupled to the tubular body with a grease or other material having a high thermal conductivity. Such a thermal coupling enables the drilling fluid flow to conduct heat away from the windings and thereby minimize resistive losses. The current through the windings may be pulsed to further aid in thermal control and increase the visibility of the field from long distances.

FIG. 4 is a flowchart of an illustrative drill-string-based electromagnetic ranging method. The method begins with the drilling crew equipping a first drill string with an EM ranging source. The source may take a form similar to that shown in FIGS. 2A-2B, and may further be embodied as a drill collar in a bottom hole assembly of the drill string. Other forms suitable for inclusion in the string above the bottom hole assembly are also contemplated, and in some cases, multiple such ranging sources may be incorporated into the drill string at a suitable spacing. When multiple such sources are incorporated, they may be configured to operate in a multiplexed fashion to facilitate their individual identification and usage. In particular, frequency or orthogonal wave shape (code division) multiplexing are specifically contemplated.

In block 404, the drilling crew employs the drill string to extend a first borehole. Normal drilling practices are employed with this drill string. If no serious well control problems are encountered, the well is completed and produced in the normal fashion. Otherwise, in block 406, a pressure kick or other well control issue is encountered during the drilling process. In block 408, the EM ranging source in the first drill string is activated. Such activation may be accomplished by circulating the drilling fluid, thereby driving a downhole generator; by transmitting a command to the control sub to turn on the source; or automatic activation may occur upon downhole detection of the well control issue.

In block 410, the drilling crew assembles a second, steerable drilling string with sensors for magnetic or electromagnetic fields. Suitable sensors may include magnetic flux gate sensors and atomic magnetometers. In block 412, the drilling crew employs the second drilling string to drill and steer a relief borehole to intersect the first borehole. The magnetic field established by the EM ranging source in the first borehole can be detected by the sensors, enabling the drilling crew to steer the second borehole "up" the magnetic field gradient to the first borehole.

In block 414, the relief borehole establishes hydraulic communication with the first borehole, enabling high density fluids to be injected into the first borehole for suppressing any inflows from the formation. With the injection of such fluids, flow control can thereby be re-established and the original borehole carefully finished and completed.

Numerous variations and modifications will become apparent to those skilled in the art once the above disclosure is fully appreciated. For example, the figures show system configurations suitable for production monitoring, but they are also readily usable for monitoring treatment operations, cementing operations, active and passive seismic surveys, and reservoir and field activity monitoring. It is intended that the following claims be interpreted to embrace all such variations and modifications.

In summary, disclosed embodiments include: An electromagnetic ranging source embodiment including: a tubular body having a circumference; a ferromagnetic core conforming to the tubular body and extending at least halfway around the circumference to define a gap with circumferentially-spaced poles; one or more current-carrying windings around the core to induce a magnetic field between the poles; and a downhole power source that drives the one or more current-carrying windings.

An electromagnetic ranging method embodiment includes: equipping a first drill string with an electromagnetic ranging source having a ferromagnetic core conforming to a circumference of a tubular body and extending at least halfway around the circumference to define a gap with circumferentially-spaced poles, the source further having one or more current-carrying windings around the core to induce a magnetic field between the poles; extending a first borehole with the first drill string; assembling a second drill string with sensors; and drilling a second borehole while using said sensors to guide the second drill string relative to the first borehole.

Additional features that may be included in any of the disclosed embodiments in any combination include: (1) the tubular body comprises a non-magnetic steel; (2) the gap extends no more than 90° of the circumference; (3) the gap of feature 2 has a circumferential dimension of at least 2 cm; (4) the gap has a transverse dimension parallel to an axis of the tubular body; (5) the gap has a transverse dimension that is angled with respect to an axis of the tubular body; (6) in combination with feature 5, the core is angled with respect to the axis of the tubular body; (7) the downhole power source provides pulsed or alternating current; (8) the downhole power source is a flow-powered electrical generator; (9) the tubular body forms part of a drill string; (10) a fluid is circulated through the first drill string, thereby powering a downhole electrical generator that is coupled to the one or more current-carrying windings; (11) the first drill string is rotated to modulate the magnetic field; (12) the second borehole is drilled to intersect the first borehole; (13) a kill fluid is pumped into the first borehole from the second borehole; and (13) prior to their performance, the assembling and drilling with the second drill string are contingent upon occurrence of a well-control problem in the first borehole.

What is claimed is:

1. An electromagnetic ranging source that comprises:
a tubular body having a circumference, wherein the tubular body forms part of a drill string;
a ferromagnetic core conforming to the tubular body and extending at least halfway around the circumference to define a gap with circumferentially-spaced poles;
one or more current-carrying windings around the core to induce a magnetic field between the poles; and
a downhole power source that drives the one or more current-carrying windings, wherein the ranging source provides a time-varying magnetic field as a ranging beacon to guide drilling of a second well relative to a first well.

2. The ranging source of claim 1, wherein the tubular body comprises a non-magnetic steel.

3. The ranging source of claim 1, wherein the gap extends no more than 90° of the circumference.

4. The ranging source of claim 3, wherein the gap has a circumferential dimension of at least 2 cm.

5. The ranging source of claim 1, wherein the gap has a long dimension parallel to an axis of the tubular body.

6. The ranging source of claim 1, wherein the gap has a long dimension that is angled with respect to an axis of the tubular body.

7. The ranging source of claim 6, wherein the core is angled with respect to the axis of the tubular body.

8. The ranging source of claim 1, wherein the downhole power source provides pulsed or alternating current.

9. The ranging source of claim 1, wherein the downhole power source is a flow-powered electrical generator.

10. An electromagnetic ranging method that comprises:
deploying a first drill string in a first borehole, the first drill string having an electromagnetic ranging source having a ferromagnetic core conforming to a circumference of a tubular body and extending at least halfway around the circumference to define a gap with circumferentially-spaced poles, the source further having one or more current-carrying windings around the core to induce a magnetic field between the poles, wherein the ranging source provides a time-varying magnetic field as a ranging beacon;
deploying a second drill string with sensors in a second borehole; and
determining distance or direction between the first drill string and the second drill string based on magnetic field measurements obtained by the sensors in response to the ranging beacon; and
extending the second borehole based on the determined distance or direction.

11. The method of claim 10, further comprising causing a downhole power source to drive the one or more current-carrying windings with pulsed or alternating current.

12. The method of claim 10, further comprising circulating a fluid through the first drill string, thereby powering a downhole electrical generator that is coupled to the one or more current-carrying windings.

13. The method of claim 10, further comprising rotating the first drill string to modulate the magnetic field.

14. The method of claim 10, wherein said drilling a second borehole includes intersecting the first borehole.

15. The method of claim 14, wherein prior to their performance, said assembling and drilling were contingent upon occurrence of a well-control problem in the first borehole.

16. The method of claim 14, further pumping a kill fluid into the first borehole via the second borehole.

* * * * *